United States Patent
Choo et al.

(10) Patent No.: US 11,457,408 B2
(45) Date of Patent: Sep. 27, 2022

(54) FULL-DUPLEX COMMUNICATION METHOD IN HIGH EFFICIENT WIRELESS LAN NETWORK AND STATION APPARATUS

(71) Applicant: SENSCOMM SEMICONDUCTOR CO., LTD., Jiangsu (CN)

(72) Inventors: Seung Ho Choo, Irvine, CA (US); Jin Won Kang, Tustin, CA (US); Sang Min Shim, Irvine, CA (US); Dae Hong Kim, Irvine, CA (US)

(73) Assignee: SENSCOMM SEMICONDUCTOR CO., LTD., Jiangsu (CN)

( * ) Notice: Subject to any disclaimer, the term of this patent is extended or adjusted under 35 U.S.C. 154(b) by 8 days.

(21) Appl. No.: 16/979,811

(22) PCT Filed: Mar. 12, 2019

(86) PCT No.: PCT/CN2019/077735
§ 371 (c)(1),
(2) Date: Sep. 10, 2020

(87) PCT Pub. No.: WO2019/174556
PCT Pub. Date: Sep. 19, 2019

(65) Prior Publication Data
US 2021/0111858 A1      Apr. 15, 2021

Related U.S. Application Data

(60) Provisional application No. 62/641,862, filed on Mar. 12, 2018, provisional application No. 62/641,832, filed on Mar. 12, 2018.

(51) Int. Cl.
*H04W 52/02*      (2009.01)
*H04L 5/14*      (2006.01)
(Continued)

(52) U.S. Cl.
CPC ....... *H04W 52/0216* (2013.01); *H04L 5/1469* (2013.01); *H04W 72/0446* (2013.01); *H04W 84/12* (2013.01)

(58) Field of Classification Search
CPC ......... H04W 52/0216; H04W 72/0446; H04W 84/12; H04L 5/1469
See application file for complete search history.

(56) References Cited

U.S. PATENT DOCUMENTS

2005/0120097 A1* 6/2005 Walton .............. H04W 72/0406
                                                             370/345
2006/0234716 A1* 10/2006 Vesterinen ........ H04W 72/0413
                                                             455/450
(Continued)

FOREIGN PATENT DOCUMENTS

CN          105071906 A      11/2015
CN          107078872 A       8/2017
(Continued)

OTHER PUBLICATIONS

International Search Report for PCT/CN2019/077735 dated May 29, 2019 from Chinese National Intellectual Property Administration.
(Continued)

*Primary Examiner* — Mohammad S Anwar
(74) *Attorney, Agent, or Firm* — Paratus Law Group, PLLC

(57) ABSTRACT

A full-duplex communication method in a high efficiency wireless local area network (WLAN), the full-duplex communication method being performed by an access point (AP) in a WLAN network, includes transmitting a reference frame to at least one station (STA); receiving an uplink frame from the at least one STA in a time period determined on the basis of the reference frame; and transmitting a downlink frame to the at least one STA in a specific time duration of the time
(Continued)

(A)

(B)

period, wherein the uplink frame and the downlink frame are transmitted through the same channel.

19 Claims, 12 Drawing Sheets

(51) Int. Cl.
  *H04W 72/04* (2009.01)
  *H04W 84/12* (2009.01)

(56) References Cited

U.S. PATENT DOCUMENTS

| | | |
|---|---|---|
| 2015/0365940 A1 | 12/2015 | Chu et al. |
| 2016/0043855 A1 | 2/2016 | Seok |
| 2016/0165589 A1* | 6/2016 | Chu .................. H04W 4/06 370/329 |
| 2017/0055284 A1 | 2/2017 | Min et al. |
| 2017/0195107 A1* | 7/2017 | Liu .................. H04L 27/2601 |
| 2017/0201975 A1* | 7/2017 | Yang .................. H04B 7/0452 |
| 2018/0020448 A1* | 1/2018 | Huang .................. H04L 69/322 |

FOREIGN PATENT DOCUMENTS

| | | | | |
|---|---|---|---|---|
| EP | 1594275 A1 | * | 11/2005 | ........... H04B 7/0613 |
| EP | 2 547 166 | * | 1/2013 | ........... H04W 76/04 |
| EP | 3 188 429 A1 | | 7/2017 | |
| KR | 10-1529672 B1 | | 6/2015 | |

OTHER PUBLICATIONS

Extended European Search Report for related EP application No. 19766709.0 dated Dec. 13, 2021 from European Patent Office.
LAN/MAN Standards Committee of the IEEE Computer Society, "Draft Standard for Information technology—Telecommunications and information exchange between systems Local and metropolitan area networks—Specific requirements", IEEE P802.11ax/D2.2, Feb. 14, 2018, pp. 1-620.
Abhishek Patil et al., "Resolution for CID 13136", IEEE 802.11-18/0363r1, Mar. 6, 2018, pp. 1-3.
Qiao Qu et al., "MU-FuPlex: a Multiuser Full-duplex MAC Protocol for the Next Generation Wireless Networks", 2017 IEEE Wireless communications and networking conference (WCNC), IEEE, Mar. 19, 2017, pp. 1-6.

* cited by examiner (A)

(B)

(A)

(B)

(A)

(B)

(A)

(B)

(C)

(D)

FULL-DUPLEX COMMUNICATION METHOD IN HIGH EFFICIENT WIRELESS LAN NETWORK AND STATION APPARATUS

CROSS-REFERENCE TO PRIOR APPLICATIONS

This application is a National Stage Patent Application of PCT International Patent Application No. PCT/CN2019/077735 (filed on Mar. 12, 2019) under 35 U.S.C. § 371, which claims priority to U.S. Provisional Application Nos. 62/641,832 (filed on Mar. 12, 2018) and 62/641,862 (filed on Mar. 12, 2018), which are all hereby incorporated by reference in their entirety.

BACKGROUND

The following description relates to a technique for performing in-band full-duplex communication in a high-efficiency wireless local area network (WLAN).

In a wireless local area network (WLAN), a single basic service set (BSS) is composed of two kinds of entities which are a single AP Station (STA) and multiple non-AP STAs. STAs share a same radio frequency channel with one out of WLAN operation bandwidth options (e.g. 20/40/80/160 MHz). Here, AP STA and non-AP STA could be referred as AP and STA, respectively.

the legacy IEEE 802.11a/b/g/n/ac standard does not guarantee communication stability in dense environments with many users. In order to overcome this limit, the High-Efficiency WLAN Study Group (HEW SG) and the IEEE Task Group ax (TGax) were formed by IEEE 802.11 working group, which has worked on the standardization of IEEE 802.11ax as the next generation WLAN standard in 2019. The IEEE 802.11ax standard aims to improve system throughput in dense environments with many APs and STAs.

SUMMARY

Full-duplex (FD) communication is one of promising next-generation wireless technologies. This technology enables up to double network throughput ideally because the information can be transmitted and received between wireless communication nodes through the same channel at the same time. In recent FD communication becomes more feasible thanks to the enhancement of self-interference cancellation (SIC) technology.

The following description is intended to provide full-duplex communication between an AP and an STA in an IEEE 802.11ax environment.

The following description enables full-duplex communication in the IEEE 802.11ax environment while maintaining backward compatibility with the IEEE 802.11 standards (802.11a/b/g/n/ac/ax). The following description provides a communication protocol for avoiding interference between an uplink signal and a downlink signal that are carried through the same channel at the same time in IEEE 802.11ax.

Figure 1:
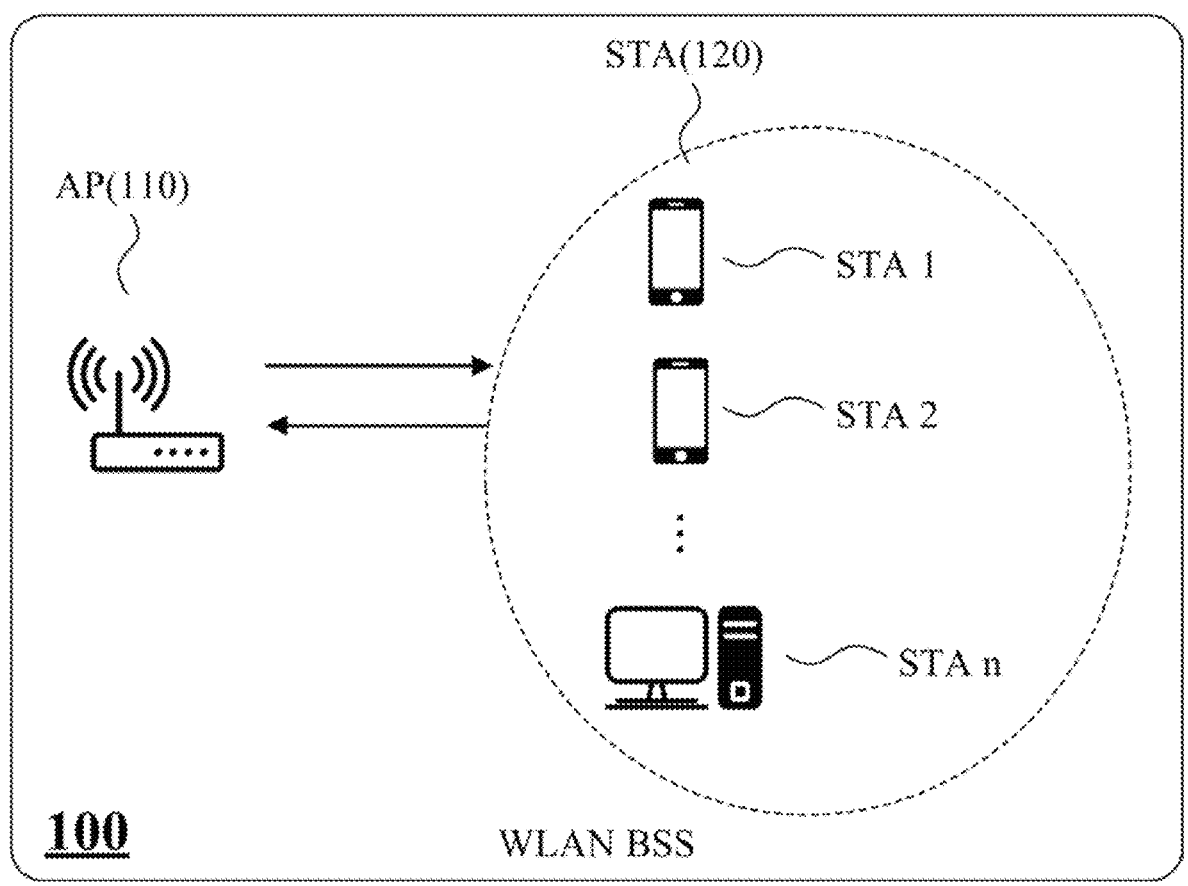
FIG. 1 illustrates an example of a basic service set in a wireless local area network (WLAN).

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

The following description applies to a wireless local area network (WLAN). The following description may apply to the next generation WLAN method (IEEE 802.11ax) or the like. The IEEE 802.11ax maintains compatibility with the conventional IEEE 802.11a/b/g/n/ac. The following description may be executed in the IEEE 802.11ax environment, and also maintains compatibility with the conventional IEEE 802.11a/b/g/n/ac.

The following description relates to in-band full-duplex communication. The following description may basically apply to the IEEE 802.11ax. However, the following description does not necessarily limitedly apply to the IEEE 802.11ax. Therefore, the following description may apply to WLAN standards that will emerge after the IEEE 802.11ax.

Terms used herein will be defined.

A WLAN or a next generation WLAN basically refers to a communication network operating according to a protocol defined in the IEEE 802.11ax. A conventional WLAN refers to a WLAN according to a standard prior to the IEEE 802.11ax.

An access point (AP) is an apparatus that provides access to the distribution system services and mostly is connected to the Internet to provide a wireless channel in a certain coverage area. The apparatus is hereinafter referred to as an AP station or an AP.

A non-AP station (STA) is an apparatus that communicates the information through a certain wireless channel allocated by an AP. The apparatus is hereinafter referred to as a station or an STA.

A signal transmitted by an AP to an STA is called a downlink signal. The downlink signal may be composed of at least one frame. The frame included in the downlink signal is called a downlink frame.

A signal transmitted by an STA to an AP is called an uplink signal. The uplink signal may be composed of at least one frame. The frame included in the uplink signal is called an uplink frame.

The full-duplex communication basically refers to in-band full-duplex transmission and reception concurrently using the same channel.

The IEEE 802.1 lax is well known as High Efficiency WLAN (HE WLAN). A Physical Protocol Data Unit (PPDU) is newly defined in the IEEE 802.11ax PHY. Examples of the PHY PPDU for data transmission include High Efficiency Single User Physical Protocol Data Unit (HE SU PPDU), High Efficiency Multi User Physical Protocol Data Unit (HE MU PPDU), High Efficiency extended range Single User Physical Protocol Data Unit (HE ER SU PPDU) and High Efficiency Trigger Based Physical Protocol Data Unit (HE TB PPDU).

First, the WLAN and the IEEE 802.11ax will be described briefly below.

FIG. 1 illustrates an example basic service set (BSS) in a wireless local area network (WLAN). A BSS may include one AP and at least one STA. FIG. 1 illustrates an example of a WLAN BSS 100 including a single AP 110 and a plurality of STAs 120. For convenience of description, it is assumed that a single BSS includes a plurality of STAs. Any one of the plurality of STAs 120 receives resources allocated for wireless communication and communicates with the AP 110. The AP 110 delivers information regarding the resource allocation to the STA.

Figure 2:
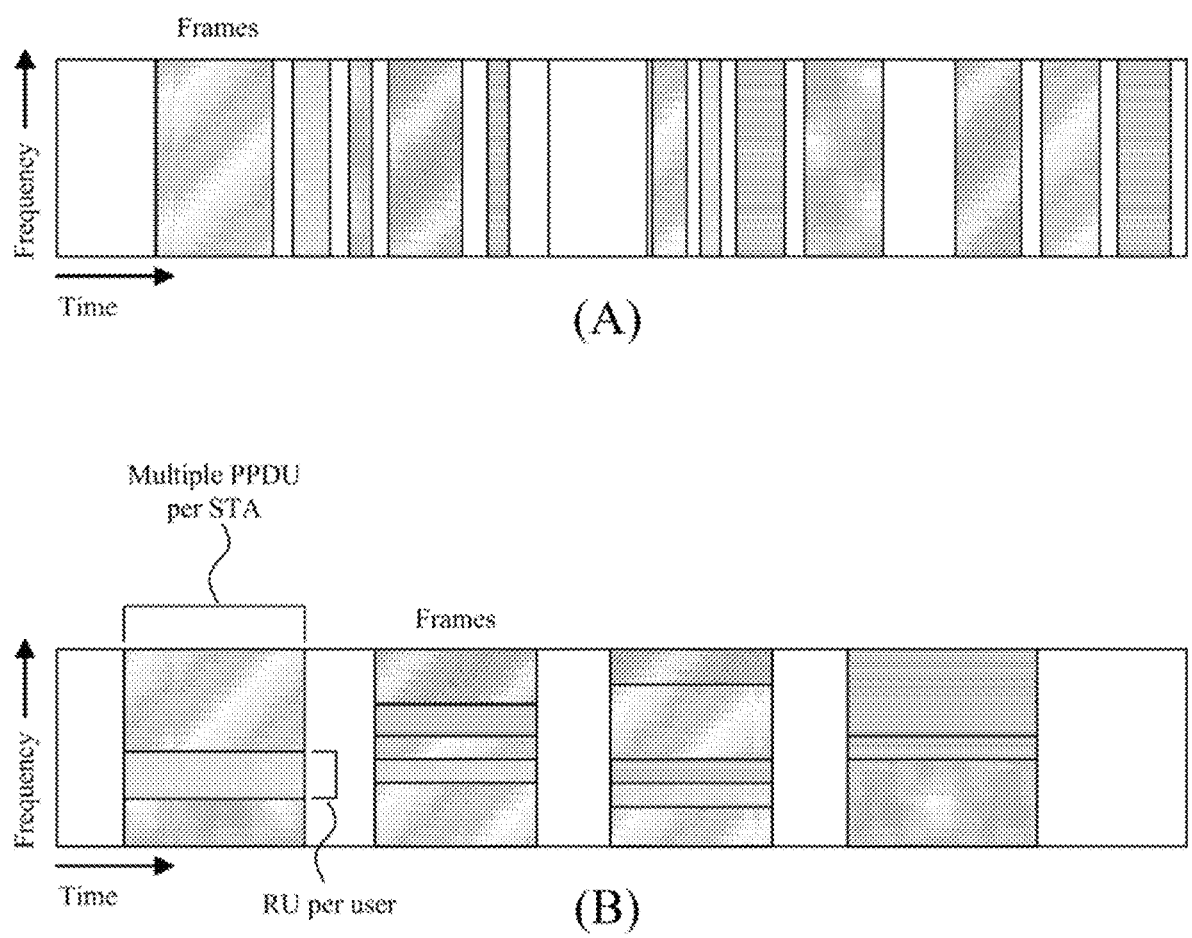
FIG. 2 illustrates example resources used for WLAN communication.

FIG. 2 illustrates example resources used for WLAN communication. In FIG. 2, one rectangular block refers to a resource allocated to one STA.

FIG. 2A illustrates Orthogonal Frequency Division Multiple (OFDM) used in the conventional IEEE 802.11. A conventional WLAN has a frame exchange performed in Time Division Multiple Access (TDMA). STAs share any one wireless frequency channel in ISM band. Only one user (STA) occupies a specific channel in a specific time period.

FIG. 2B illustrates Orthogonal Frequency Division Multiple Access (OFDMA) modulation technology was employed newly in the IEEE 802.11ax. In OFDMA, one wireless channel can be composed of one or multiple resource units and the IEEE 802.11ax defines RU as a minimum allocation unit which is a group of subcarriers. The OFDMA enables multi-user transmission using frequency orthogonal division in the same time period. Any one user (STA) may use one RU in a specific time period. The AP may allocate different RUs to one or a plurality of STAs in a WLAN packet. Alternatively, the AP may separate spatial streams in a specific RU to allocate resources to any one or a plurality of STAs. The OFDMA provides more dynamic resource allocation to multiple users than the OFDM.

Figure 3:
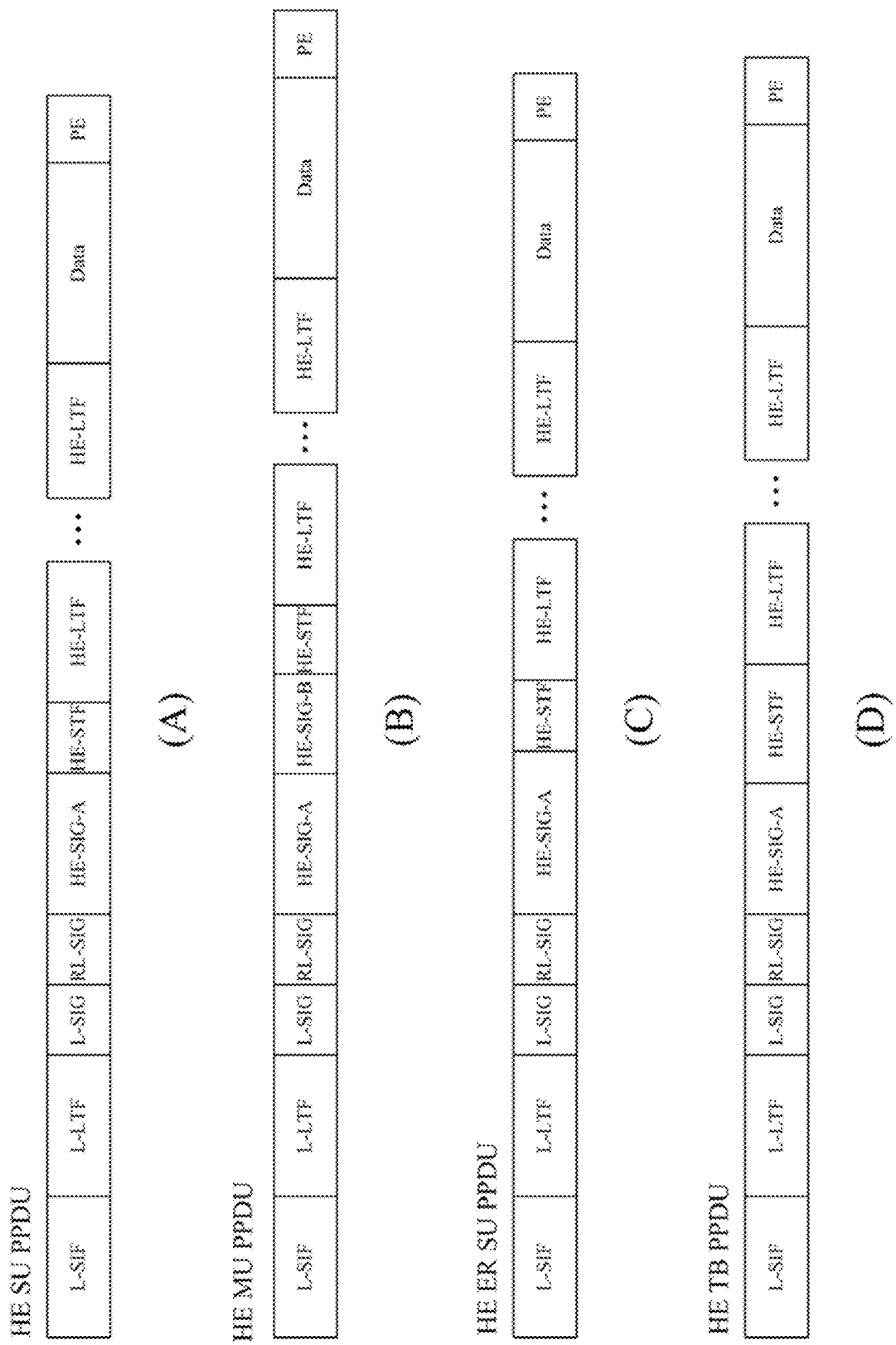
FIG. 3 illustrates an example PHY PPDU packet format defined in 802.11ax.

FIG. 3 illustrates an example PHY PPDU packet format newly defined in 802.11ax. The PPDUs in FIG. 3 are as follows: HE SU PPDU; HE MU PPDU; HE ER SU PPDU; and HE TB PPDU. The formats are shown in FIG. 3. Details of fields constituting each of the formats shown in FIG. 3 are shown in Table 1 below. Detailed descriptions of the fields will be omitted. The HE TB PPDU will be described below with reference to FIG. 8.

TABLE 1

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAL field |
| HE-SIG-A | HE SIGNAL A field |
| HE-SIG-B | HE SIGNAL B field |
| HE-STF | HE Short training field |
| HE-LTF | HE Long Training field |
| Data | The Data field carrying the PSDU(s) |
| PE | Packet |

Figure 4:
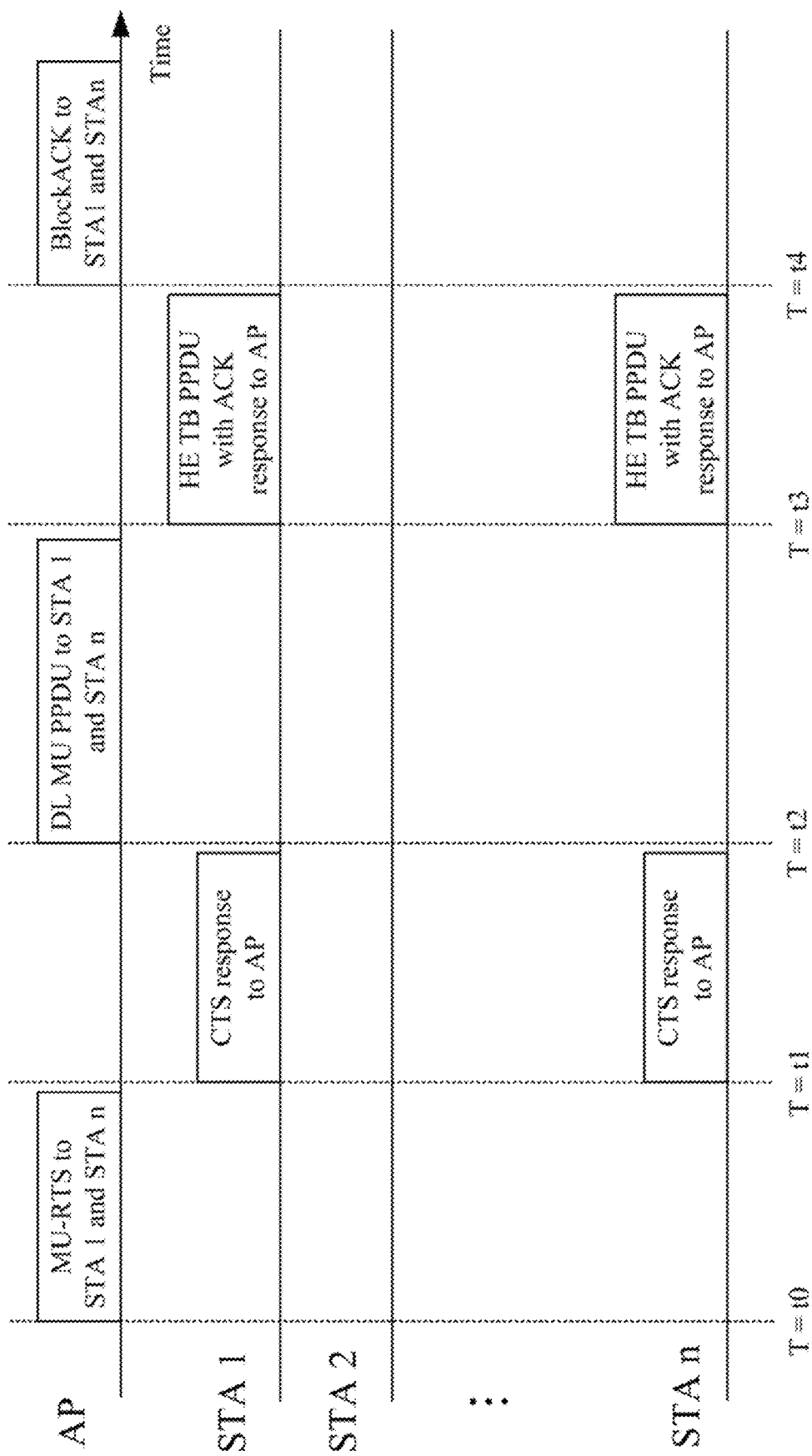
FIG. 4 illustrates an example communication process between an access point (AP) and a station (STA) in 802.11ax.

FIG. 4 illustrates an example communication process between an AP and multiple STAs in 802.11ax. FIG. 4 illustrates an example communication process in a BSS in which there are a single AP and 'n' number of STAs. This example will be described in time order. FIG. 4 describes a multi-user (MU) scenario as an example.

The AP transmits a Multi-User Request-to-Send (MU-RTS) frame to STA 1 and STA n at time T=t0. In response to the MU-RTS frame, STA 1 and STA n commence a Clear-to-Send (CTS) frame at time T=t1. After receiving the CTS response successfully, the AP can perform the following steps. The MU-RTS/CTS exchange corresponds to a pre-operation for WLAN data transmission. This process is optional, and thus may not be an operation that must be performed before a DL MU PPDU.

The AP transmits a frame including resource allocation information to solicited STAs. The AP transmits a DL MU PPDU to solicited STAs, herein, STA 1 and STA n at time T=t2. The DL MU PPDU may include a trigger frame or the DL MU PPDU may include a triggered response scheduling (TRS) control field. In response to the DL MU PPDU, STA 1 and STA n transmit an HE TB PPDU at time T=t3 as a response frame along with an ACK. The solicited STAs transmit the HE TB PPDU using allocated RU respectively.

The AP may transmit a BlockAck frame in response to the reception of the HE TB PPDU. This kind of transmission of the BlockAck frame may be optional.

By repeating the above communication process, the AP may communicate with a plurality of STAs.

Full-duplex communication applicable to a WLAN environment such as 802.11ax will be described below. It is assumed that an AP and STA which will be mentioned support IEEE 802.11ax.

Figure 5:
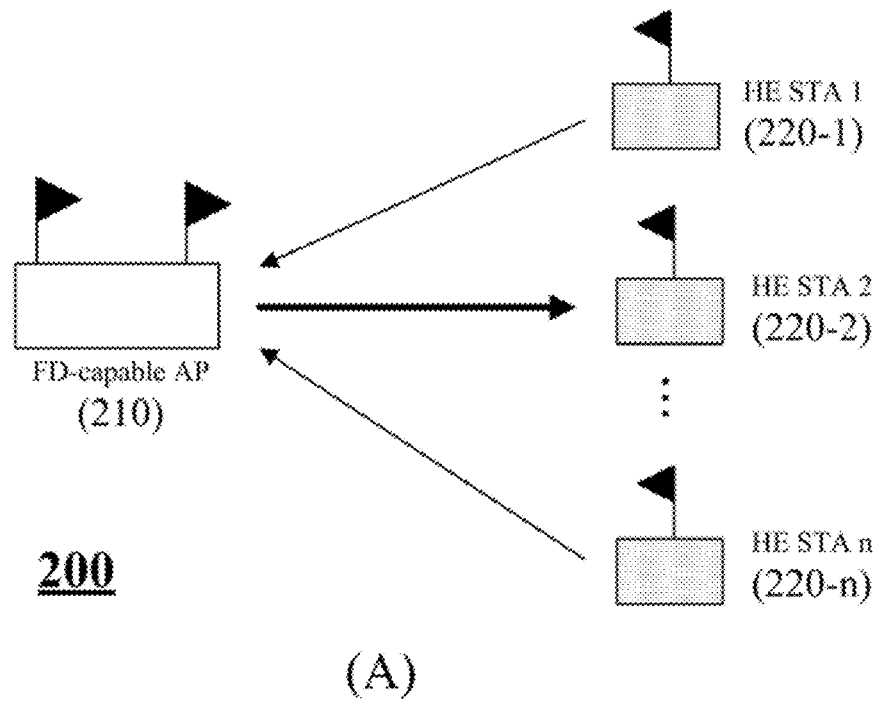
FIG. 5 illustrates an example process of performing full-duplex communication in a WLAN environment.
Figure 5:
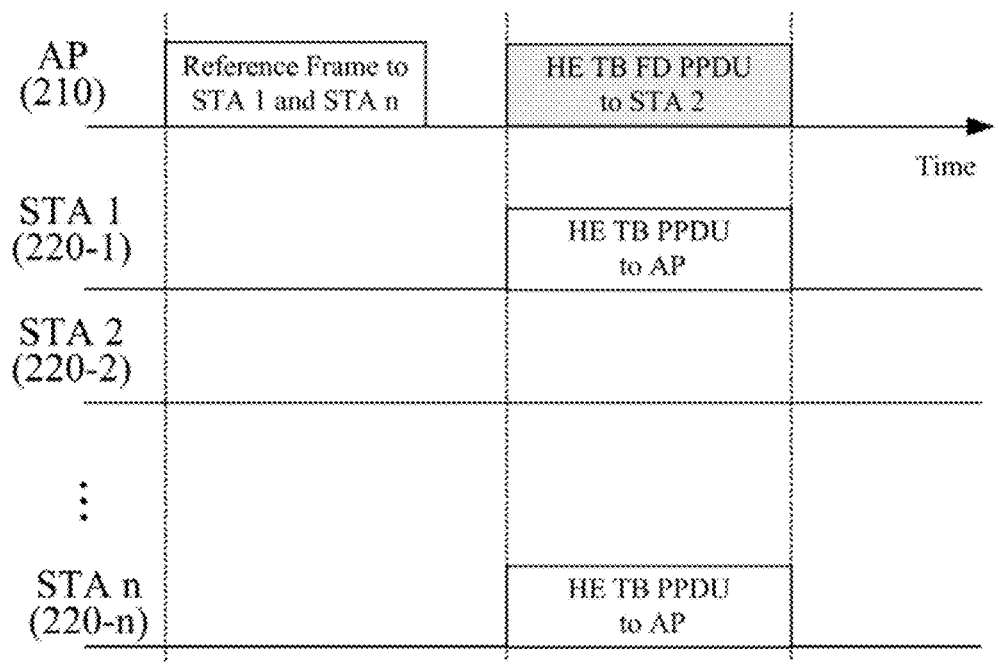

FIG. 5 illustrates an example process of performing full-duplex communication in a WLAN environment. FIG. 5A illustrates a BSS 200 that performs full-duplex communication in a WLAN environment. The BSS 200 includes a single AP 210 and n number of STAs 220-1, 220-2, . . . , 220-n. The AP 210 is an AP capable of full-duplex communication (hereinafter referred to as an FD-capable AP). The FD-capable AP may be an AP having a function of cancelling self-interference (SI) caused by a signal transmitted by the AP itself. The SI cancellation technology can be implemented in various ways.

FIG. 5B illustrates an example for a full-duplex communication in the BSS 200. This example will be described in time order. The AP 210 transmits a reference frame to STA 1 220-1 and STA n 220-n. The reference frame may be the above-described trigger frame. Also, the reference frame may include a TRS control field. The reference frame may include RU allocation information for OFDMA communication.

When the reference frame is received, solicited STA 1 220-1 and STA n 220-n transmit an HE TB PPDU through allocated RUs. STA 1 220-1 and STA n 220-n may transmit an HE TB PPDU to the AP in the same time period. STA 1 220-1 and STA n 220-n may transmit an HE TB PPDU at a certain timing on the basis of the received reference frame. That is, STA 1 220-1 and STA n 220-n may synchronize frames to be transmitted by using the timing of the received reference frame end.

Meanwhile, the AP 210 may transmit a certain frame to STA 2 220-2 at or within the same time period in which STA 1 220-1 and STA n 220-n transmit an HE TB PPDU. Herein the frame transmitted from the AP 210 is represented as an HE TB FD PPDU. That is, the AP 210 transmits a frame to STA 2 220-2 while receiving frames from STA 1 220-1 and STA n 220-n in the same time period (full-duplex communication). In FIG. 5A, a downlink constituting the full-duplex communication is represented by a thick solid line. The AP 210 synchronizes downlink and uplink and then performs downlink transmission. The AP 210 transmits an HE TB FD PPDU on the basis of the reference frame transmitted by the AP 210 or on the basis of timing information included in the reference frame.

Figure 6:
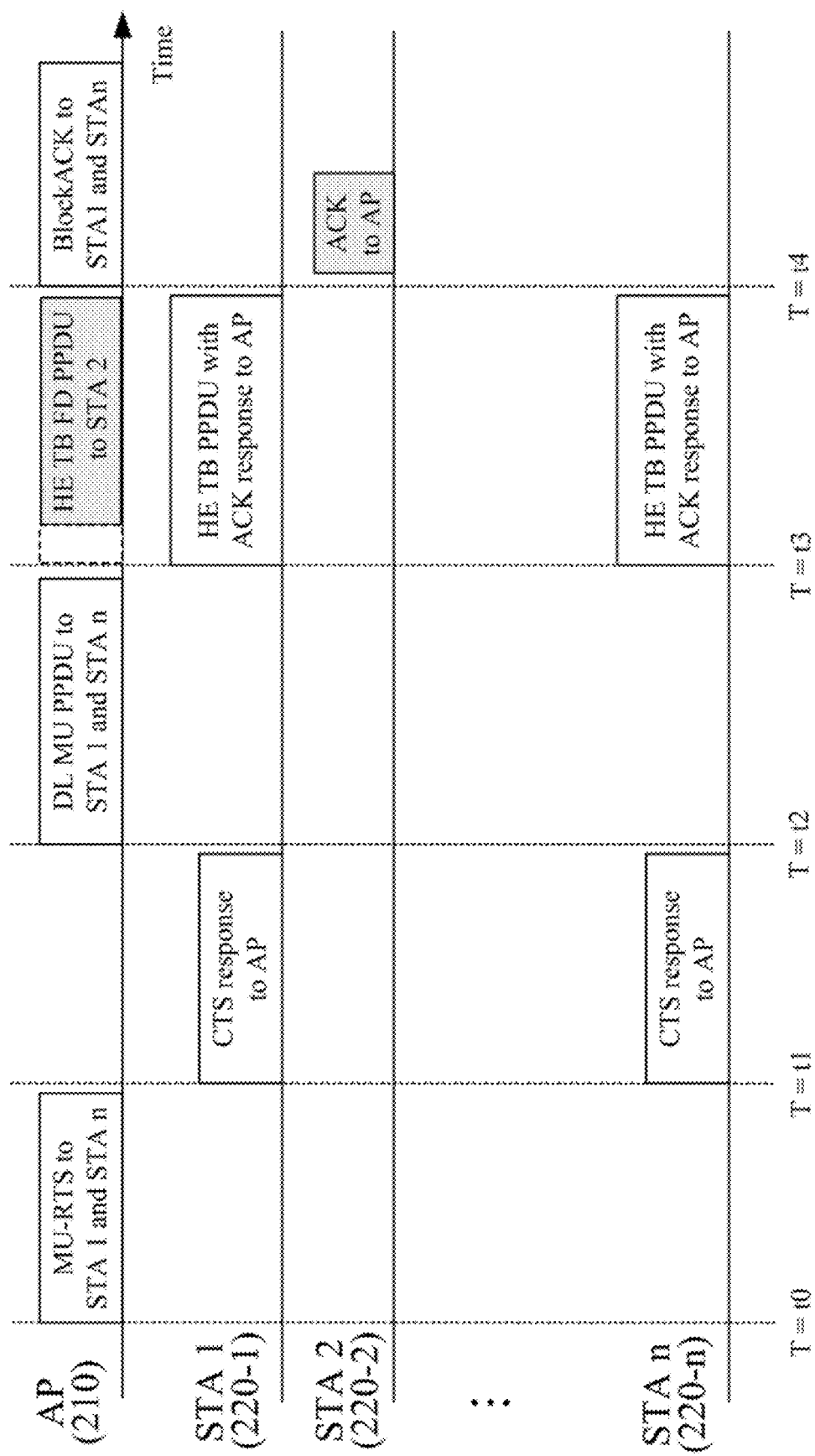
FIG. 6 illustrates another example process of performing full-duplex communication in a WLAN environment.

FIG. 6 illustrates another example process of performing full-duplex communication in a WLAN environment. FIG. 6 may be an example process of the BSS of FIG. 5A. This example will be described in time order.

The AP 210 transmits an MU-RTS frame to STA 1 220-1 and STA n 220-n at time T=t0. In response to the MU-RTS frame, STA 1 220-1 and STA n 220-n commence the transmission of a CTS frame at time T=t1 respectively in OFDMA modulation way. After receiving the CTS response, the AP can perform the following steps. The MU-RTS/CTS exchange corresponds to a pre-operation for MU transmission. This process is optional, and thus may not be an operation that must be performed before the DL MU PPDU.

The AP 210 transmits the DL MU PPDU to STA 1 220-1 and STA n 220-n at time T=t2. The DL MU PPDU corresponds to the above-described reference frame. The DL MU PPDU may include a TRS control field. The DL MU PPDU may include RU allocation information for STAs. When the reference frame is received, STA 1 220-1 and STA n 220-n may transmit an HE TB PPDU through allocated RUs along with an ACK at time T=t3. STA 1 220-1 and STA n 220-n may transmit an HE TB PPDU to the AP in the same time period. STA 1 220-1 and STA n 220-n may transmit an HE TB PPDU at a certain timing which is the SIFS time boundary, after the end of a received reference frame. That is, STA 1 220-1 and STA n 220-n may synchronize frames to be transmitted by using the received DL MU PPDU. A SIFS is the time from the end of the last symbol, or signal extension if present, of the previous frame to the beginning of the first symbol of the preamble of the subsequent frame. For example, if the control frame is a response frame of a previous frame, the WLAN device transmits the control frame without performing backoff if a SIFS has elapsed.

Meanwhile, the AP 210 may transmit an HE TB FD PPDU to STA 2 220-2 at time T=t3. That is, the AP 210 transmits a frame to STA 2 220-2 while receiving frames from STA 1 220-1 and STA n 220-n in the same time period (full-duplex communication). The AP 210 transmits an HE TB FD PPDU on the basis of the DL MU PPDU transmitted by the AP 210 or on the basis of timing information included in the DL MU PPDU. Referring to FIG. 6, a null portion are shown in front of the HE TB FD PPDU at time T=t3. This will be described with FIG. 8.

In response to the reception of the HE TB PPDU, the AP 210 may transmit a BlockAck frame to STA 1 220-1 and STA n 220-n at time T=t4. The transmission of the BlockAck frame may be optional. Also, at time T=t4, STA 2 220-2 may transmit an ACK for the HE TB FD PPDU corresponding to time T=t3.

Figure 7:
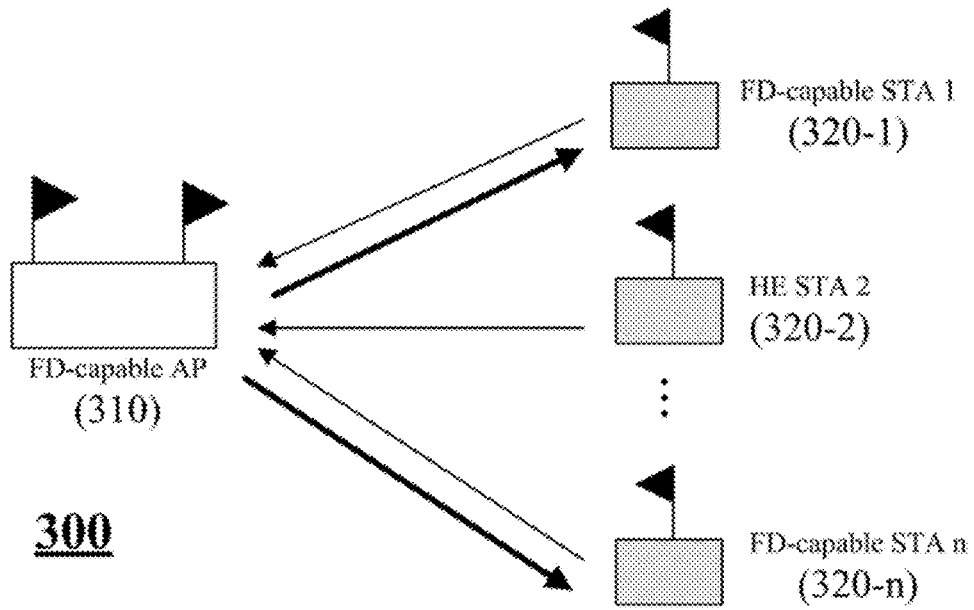
FIG. 7 illustrates still another example process of performing full-duplex communication in a WLAN environment.
Figure 7:
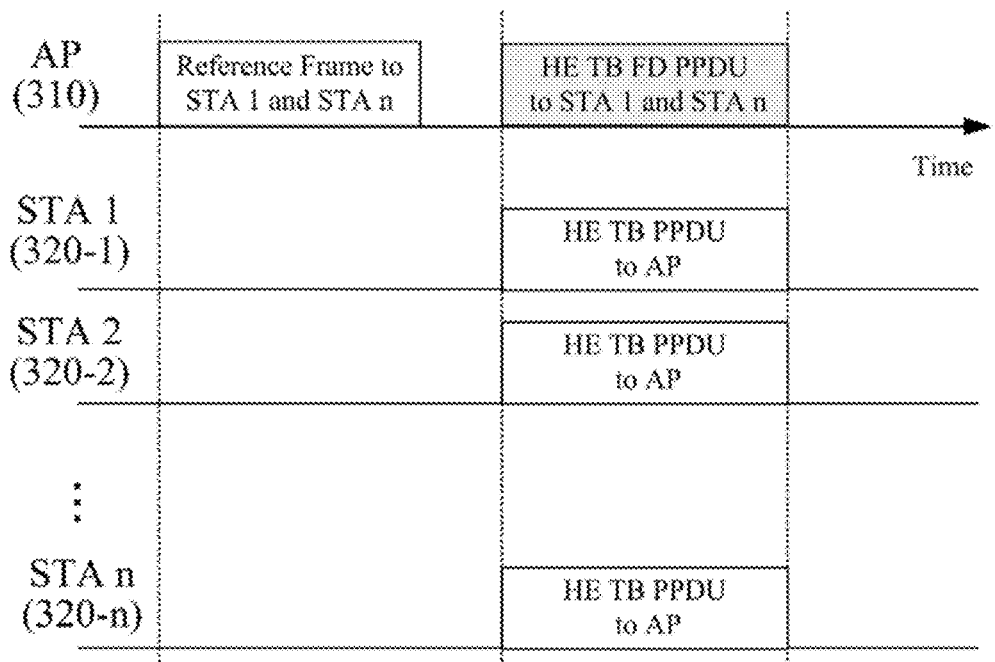

FIG. 7 is still another example process of performing full-duplex communication in a WLAN environment. FIG. 7A illustrates a BSS 300 that performs full-duplex communication in a WLAN environment. The BSS 300 includes a single AP 310 and n STAs 320-1, 320-2, . . . , 320-n. The AP 310 is an AP capable of full-duplex communication (hereinafter referred to as an FD-capable AP). The FD-capable AP may be an AP having a function of cancelling self-interference (SI) caused by a signal transmitted by the AP itself. STA 1 320-1 and STA n 320-n are STAs capable of full-duplex communication. The FD-capable STA may be an STA having a function of cancelling self-interference (SI) caused by a signal transmitted by the STA itself. The SI cancellation technology can be implemented in various ways.

FIG. 7B illustrates an example in which full-duplex communication is performed in the BSS 300. This example will be described in time order. The AP 310 transmits a reference frame to STA 1 320-1 and STA n 320-n. The reference frame may be the above-described trigger frame. Also, the reference frame may include a TRS control field. The reference frame may include RU allocation information for OFDMA communication.

When the reference frame is received, STA 1 320-1 and STA n 320-n transmit an HE TB PPDU through allocated RUs. STA 1 320-1 and STA n 320-n may each transmit an HE TB PPDU to the AP in the same time period. STA 1

320-1 and STA n 320-n may transmit an HE TB PPDU at a certain timing on the basis of the received reference frame. That is, STA 1 320-1 and STA n 320-n may synchronize frames to be transmitted by using the received reference frame.

Meanwhile, the AP 310 may transmit an HE TB FD PPDU to STA 1 320-1 and STA n 320-n at or within a time period in which the HE TB PPDU is received (full-duplex communication). In FIG. 7A, a downlink constituting the full-duplex communication is represented by a thick solid line. The AP 310 synchronizes downlink and uplink and then performs downlink transmission. The AP 310 transmits an HE TB FD PPDU on the basis of the reference frame transmitted by the AP 310 or on the basis of timing information included in the reference frame.

Similarly, to FIG. 6, although not shown in FIG. 7B, the MU-RTS/CTS exchange may be performed before the reference frame is transmitted. Also, after the HE TB FD PPDU is transmitted, the AP 310 may transmit a BlockAck frame in response to the reception of the HE TB PPDU. Also, STA 1 320-1 and STA n 320-n may transmit an ACK for the HE TB FD PPDU.

Figure 8:
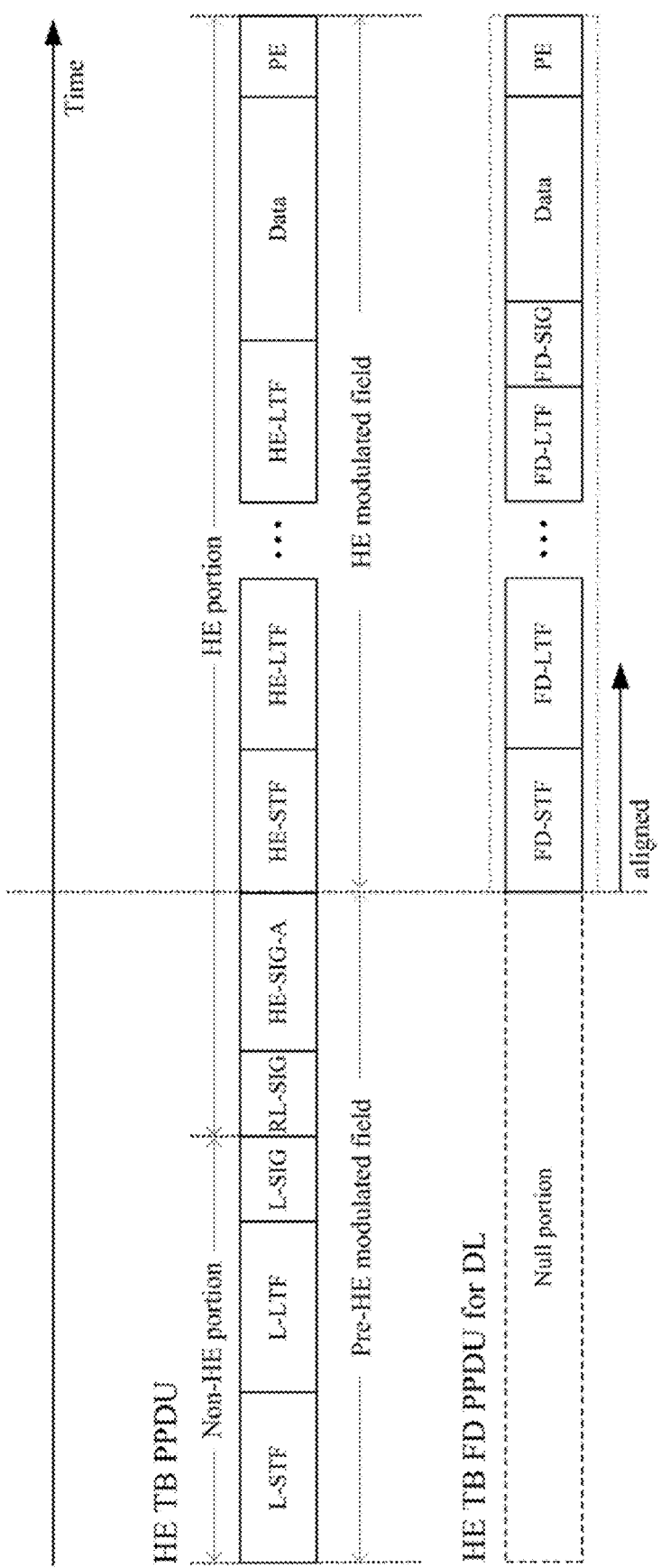
FIG. 8 illustrates an example packet for full-duplex communication.

FIG. 8 is an example packet for full-duplex communication. An HE TB PPDU structure defined in IEEE 802.11ax is shown in an upper portion of FIG. 8. An example HE TB FD PPDU structure is shown in a lower portion of FIG. 8. An example in which the HE TB PPDU and the HE TB FD PPDU are placed in the same time period is shown. FIG. 8 is an example in which HE TB PPDU (uplink) and HE TB FD PPDU (downlink) constituting full-duplex communication are placed in the same time period.

As described above, the HE TB PPDU may be transmitted in a certain time period on the basis of a reference frame (trigger framing) sent by AP. In this case, the HE TB PPDU may be transmitted after a short IFS (SIFS) time interval from the reference frame end. The SIFS refers to the shortest one among inter-packet space time intervals between consecutive two packets defined in the standard.

The HE TB PPDU can be divided into a non-HE portion and an HE portion. The non-HE portion includes a L-short training field (STF), L-long training field (LTF), and L-signal information field (SIG). These fields are defined in a conventional WLAN standard. 802.11ax uses the same fields as described in the WLAN standard for the purpose of compatibility with conventional WLAN. The L-STF is a short training sequence and is used for packet detection and automatic gain adjustment (AGC). The L-LTF is a relatively long training sequence and is used for channel estimation. The L-SIG may include control information corresponding to decoding of PSDU or the like.

RL-SIG, in which a conventional legacy L-SIG is repeated, is a field for HE PPDU detection. HE-SIG-A includes MCS, a frequency bandwidth, the number of spatial streams (NSTS), and parameters for frame decoding. HE-STF and HE-LTF include a training sequence for multiple-input and multiple-output (MIMO). The HE-STF is mainly used to measure automatic gain adjustment during MIMO transmission. The HE-LTF is used to estimate a MIMO channel. The HE-LTF has a variable length. Data field includes an encoder/decoder scrambler and an encoded MAC frame. PE is an extension field.

The HE TB PPDU can be divided into a pre-HE modulated field and an HE modulated field. HE PHY can support DFT periods of 3.2 μs and 12.8 μs for the pre-HE modulated field and the HE modulated filed of the HE PPDU, respectively.

In the HE TB FD PPDU, a modulated signal may be transmitted in a region in which the HE modulated field of the HE TB PPDU is started in the same time period. The HE TB FD PPDU may be aligned to the HE modulated field of the HE TB PPDU in the same time period. A null portion may be a signal field in which no signal is transmitted. Also, the null portion may be a signal field for transmitting information that does not affect the demodulation processing of the HE TB PPDU by the AP. The HE TB FD PPDU may be transmitted in a time period in which the AP receives the HE TB PPDU, and the HE TB FD PPDU is intended to be transmitted in a period that does not affect the processing of the received HE TB PPDU. That is, the AP controls a time to transmit the HE TB FD PPDU such that the transmission of the HE TB FD PPDU does not disturb the transmission of the HE TB PPDU. The AP ensures that the training process for the received HE TB PPDU is normally performed.

A lower portion of FIG. 8 illustrates an HE TB FD PPDU structure. The HE TB FD PPDU structure shown in FIG. 8 is an example, and the HE TB FD PPDU may have another structure. FIG. 8 illustrates an example including FD-STF, FD-LTF, FD-SIG, and the like. In this case, the fields may perform functions similar to those of the HE-STF, HE-LTF, and HE-SIG.

Figure 9:
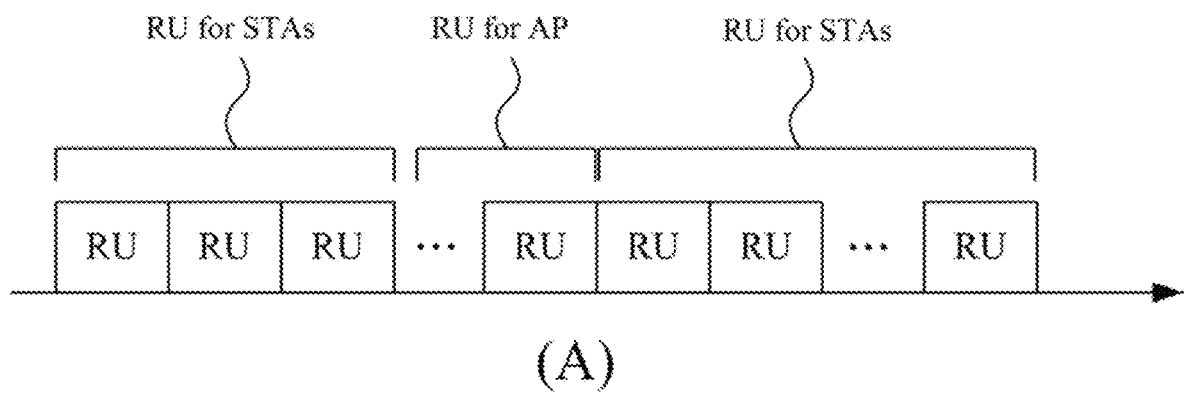
FIG. 9 illustrates example resources to be allocated for full-duplex communication.
Figure 9:
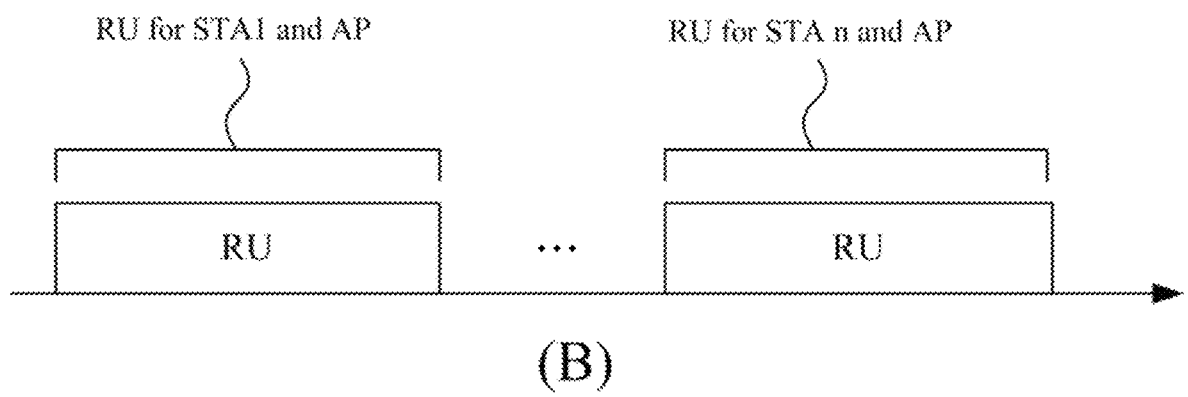

FIG. 9 illustrates example resources to be allocated for full-duplex communication. FIG. 9A illustrates an example in which individual RUs are allocated to uplink and downlink. As described in FIG. 5, when an FD-capable AP performs full-duplex communication with any STA, the AP and the STA may use different RUs.

FIG. 9B illustrates an example in which a common RU is allocated to uplink and downlink. FIG. 9B illustrates a case in which a pair of AP and STA uses a single common RU. As shown in FIG. 7, when an FD-capable AP and an FD-capable STA perform full-duplex communication, the pair may use a common RU. The AP may deliver information regarding the RU through the reference frame (the trigger frame). FIG. 9B illustrates an example in which the AP of FIG. 7 and STA 1 use a common RU and the AP of FIG. 7 and STA n use a common RU.

Figure 10:
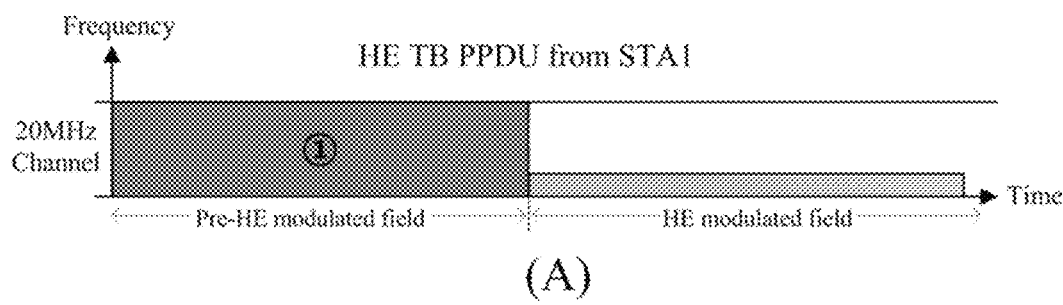
FIG. 10 illustrates example resource allocation for full-duplex communication.
Figure 10:
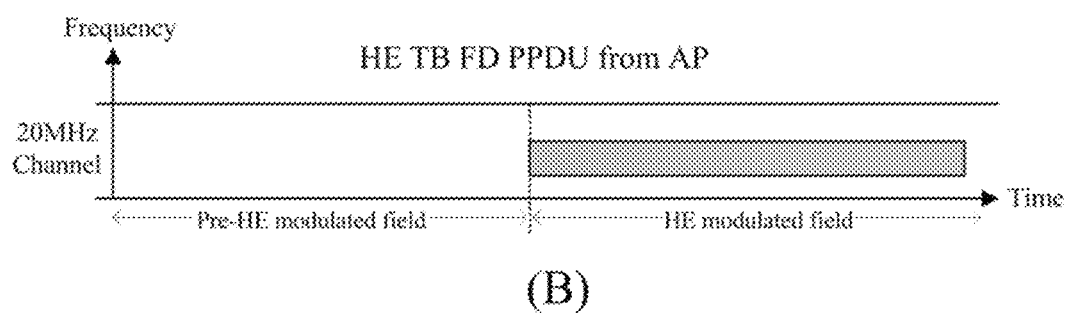
Figure 10:
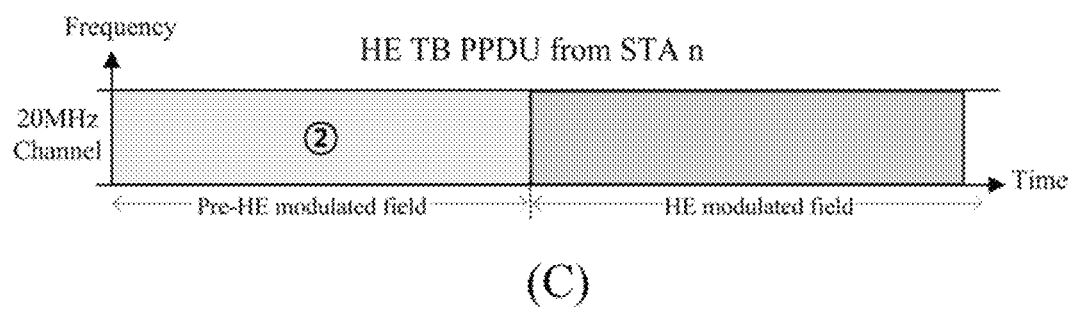
Figure 10:
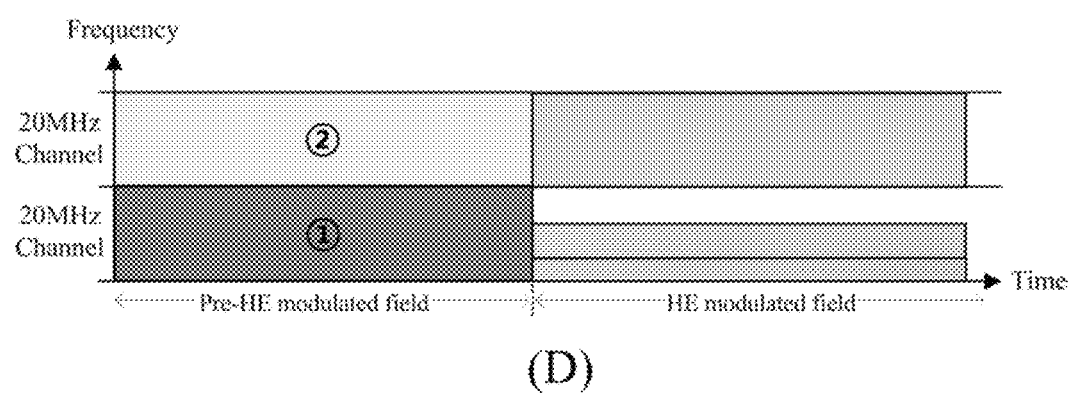

FIG. 10 illustrates an example of resource allocation for full-duplex communication. FIG. 10 illustrates an example in which an AP receives an HE TB PPDU from two STAs (STA 1 and STA n) at a specific time and transmits an HE TB FD PPDU to an STA (STA1, STA n, or another STA) at the same specific time. FIG. 10 illustrates a 40-MHz band, as an example.

FIG. 10A illustrates an example of resource allocation for the HE TB PPDU transmitted by STA 1. FIG. 10B illustrates an example of resource allocation for the HE TB FD PPDU transmitted by the AP. In the HE TB FD PPDU, a signal is transmitted only in the HE modulated field as described above. FIG. 10C illustrates an example of resource allocation for the HE TB PPDU transmitted by STA n. FIG. 10D illustrates an example in which resources are allocated to frames transmitted by STA 1, STA n, and the AP in the same time period. Referring to FIG. 10, it shows that three individual frames may be simultaneously transmitted on two channels of 20 MHz.

When 242-tone RU (20 MHz) or less-tone RU is allocated, a pre-HE modulated field is generally transmitted at corresponding 20 MHz (indicated by ① and ② in FIG. 10). However, in some cases, the pre-HE modulated field may be transmitted at 40 MHz including a corresponding 20 MHz channel (not shown).

Figure 11:
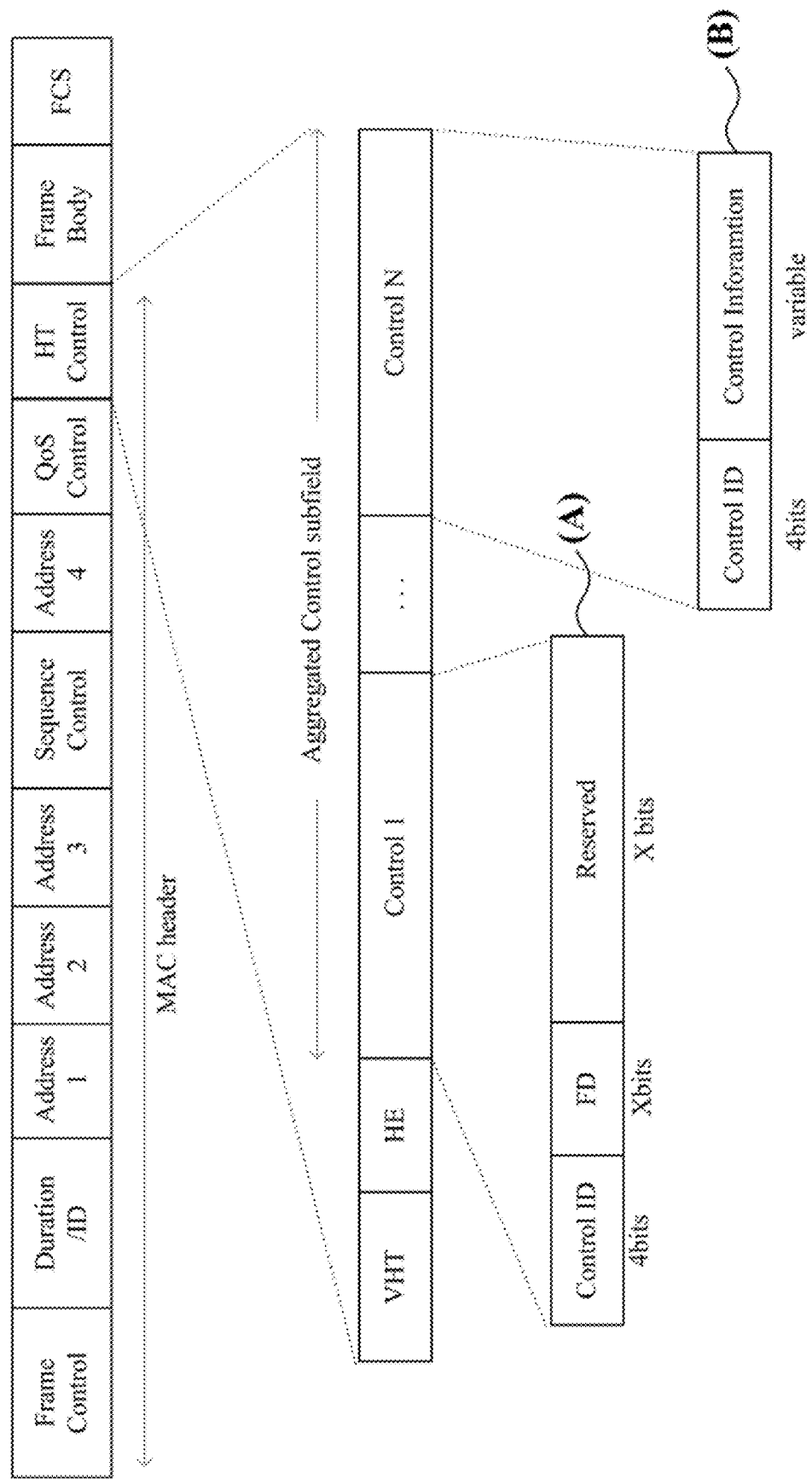
FIG. 11 illustrates an example reference frame.

FIG. 11 illustrates an example reference frame. The reference frame may be a trigger frame defined in IEEE 802.11ax. The reference frame may include information regarding RUs for full-duplex communication (FD). Resource allocation information for the FD communication may be implemented in various ways. FIG. 11 illustrates an example frame to be used in 802.11ax. A description of information included in a MAC header, that is, a description of the same part as a conventional WLAN header will be omitted.

HT Control includes an aggregated control subfield. In FIG. 11, a part (A) indicates an example in which a field for FD resource information is separately added to the control subfield. The part (A) includes Control ID, FD, and Reserved field. Control ID is an identifier about information indicated by the control subfield. When Control ID is configured to set a value indicating FD resource information, FD field may include resource information for the FD communication. In FIG. 11, a part (B) indicates another example control subfield. In the part (B), when Control ID is configured to set a value indicating FD resource information, the resource information for the FD may be included in Control Information field. Alternatively, when Control ID is a specific value to which any current use is not allocated, the resource information for the FD feature may be included in Control Information field.

FIG. 11 illustrates an example in which the FD resource information is conveyed using HT Control field. In some cases, the reference frame may convey the FD resource information through another field or an FD-dedicated field.

Figure 12:
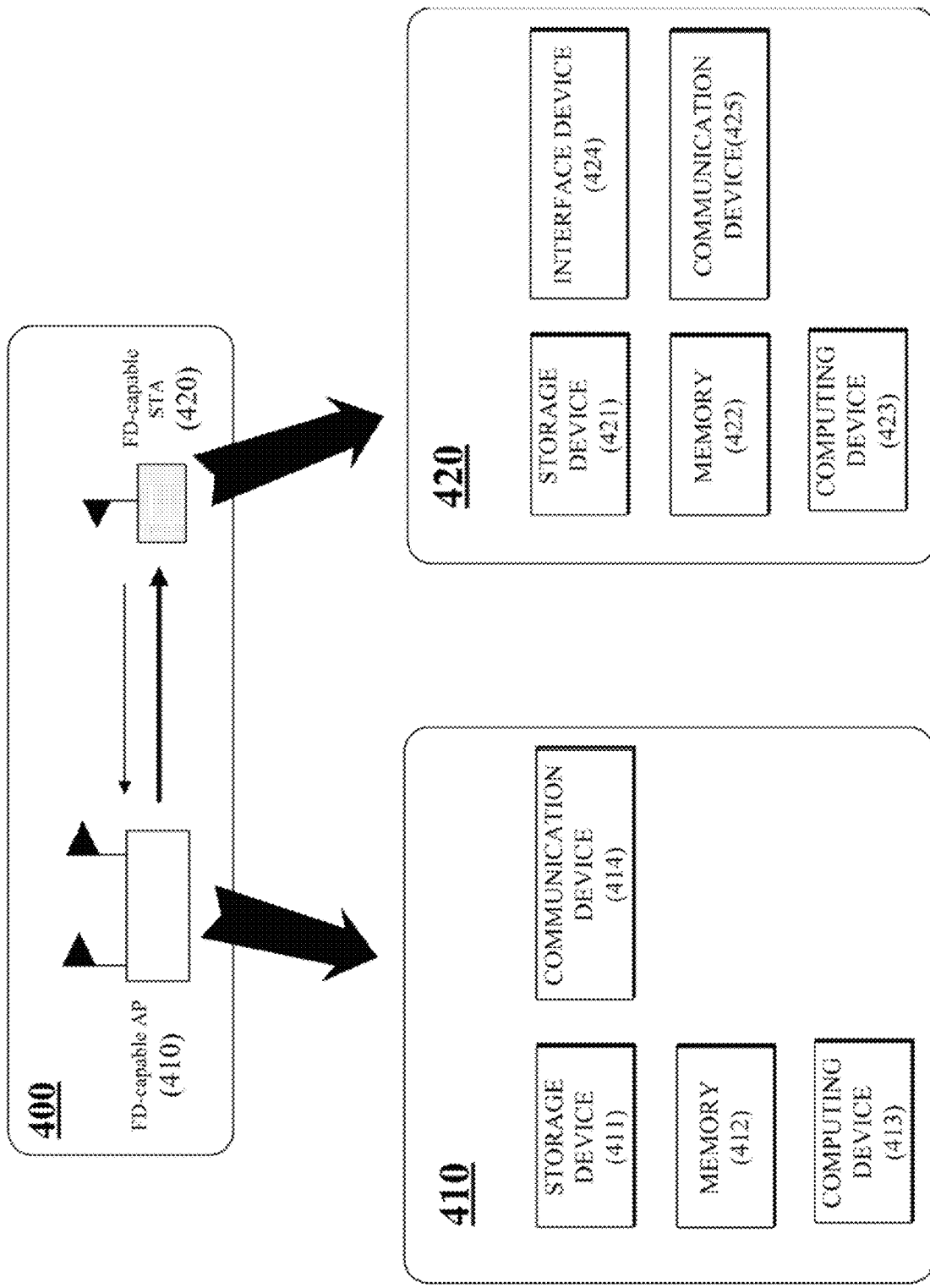
FIG. 12 illustrates an example block diagram of an AP and an STA.

FIG. 12 illustrates an example block diagram of an AP and an STA. FIG. 12 illustrates a BSS including a single AP 410 and a single STA 420, as an example. It is assumed that the AP 410 and the STA 420 are FD-capable apparatuses.

The AP 410 includes a storage device 411, a memory 412, a computing device 413, and a communication device 414. In FIG. 12, the storage device 411, the memory 412, the computing device 413, and the communication device 414 are shown as separate independent elements. At least any combination merged with two or more components among the storage device, the memory, the computing device and the communication device 414 may be configured in an integrated manner.

The storage device 411 stores a source code or program for WLAN communication with the STA. The storage device 411 stores information for high-efficiency WLAN communication by default. Also, the storage device 411 may store information for the above-described full-duplex communication. The storage device 411 may be implemented in the form of a hard disk, a read-only memory (ROM), a flash memory, or the like. The storage device 411 may store data to be transmitted and data received.

The memory 412 may temporarily store data generated while the AP 410 performs communication.

The communication device 414 refers to an element for transmitting and receiving data through WLAN communication. The communication device 414 may include at least one antenna and a communication module. The communication device 414 may include a plurality of antennas for MIMO. The communication device 414 may receive packets from at least one STA. Also, the communication device 414 may transmit packets to at least one STA. The communication device 414 may receive program update information from an external object.

The computing device 413 may transmit and receive data (packets) using a program stored in the storage device 411. The computing device 413 may transmit a reference frame to at least one STA through the communication device 414 according to a received command or a generated command. The communication device 414 may receive an uplink frame from an STA in a specific time period determined on the basis of the reference frame. The computing device 413 may transmit a downlink frame to an STA through the communication device 414 in a part time of the time period in which the downlink frame is received. In this case, the computing device 413 may transmit a downlink frame to the STA having transmitted the uplink or another STA. In this case, the computing device 413 may perform control such that the downlink frame is transmitted to an HE modulated field of an uplink frame. The computing device 413 may be a device for processing data and performing certain computation, such as a processor, an AP, and a chip with an embedded program.

For example, the AP 410 may transmit the DL MU PPDU to the STA 420. The AP 410 may receive the HE TB PPDU from the STA 420 in a specific time period. In this case, the AP 410 may transmit the HE TB FD PPDU to the STA 420 or another STA in a period in which an HE TB PPDU HE modulated field is transmitted.

Although not shown in FIG. 12, the AP 410 may include an element for cancelling SI to perform full-duplex communication.

The STA 420 includes a storage device 421, a memory 422, a computing device 423, an interface device 424, and a communication device 425. In FIG. 12, the storage device 421, the memory 422, the computing device 423, the interface device 424, and the communication device 425 are shown as separate independent elements. At least any combination merged with two or more components among the storage device 421, the memory 422, the computing device 423, the interface device 424 and the communication device 425 may be configured in an integrated manner.

The storage device 421 stores a source code or program for WLAN communication with the AP. The storage device 421 stores information for high-efficiency WLAN communication by default. Also, the storage device 421 may store information for the above-described full-duplex communication. The storage device 421 may be implemented in the form of a hard disk, a ROM, a flash memory, or the like. The storage device 421 may store data to be transmitted and data received.

The memory 422 may temporarily store data generated while the STA 420 performs communication.

The interface device 424 is a device for receiving certain commands or data from the outside. The interface device 424 may receive certain commands or data from an external storage device or an input device that is physically connected to the interface device 424. The interface device 424 may receive a command for communication with the AP 410, control information, data to be transmitted, or the like.

The communication device 425 refers to an element for transmitting and receiving data through WLAN communication. The communication device 425 may include at least one antenna and a communication module. The communication device 425 may include a plurality of antennas for MIMO. The communication device 425 may receive packets from the AP. Also, the communication device 425 may transmit packets to the AP. The communication device 425 may receive program update information from an external object.

The computing device 423 may transmit and receive data (packets) using a program stored in the storage device 421. The communication device 425 may receive a reference frame from the AP 410. The computing device 423 may determine a specific time period on the time basis of the reference frame. The computing device 423 may transmit an uplink frame to the AP through the communication device 425 in the determined specific time period. The computing device 423 may be a device for processing data and performing certain computation, such as a processor, an AP, and a chip with an embedded program.

The communication device 425 may receive a downlink frame from the AP 410 in a part time of the period in which the uplink frame is transmitted. In this case, the downlink frame may be received in a region where an HE modulated field of the uplink frame is placed. The computing device 423 may control the communication device 425 such that the downlink frame is received at the same time as the uplink frame is transmitted.

For example, the STA 420 may receive the DL MU PPDU from the AP 410. The STA 420 may transmit the HE TB PPDU in a specific time period on the basis of the DL MU PPDU. The STA 420 may receive the HE TB FD PPDU from the AP 410 while transmitting the HE TB PPDU. The HE TB FD PPDU may be received in a period in which the HE modulated field of the HE TB PPDU is transmitted.

Although not shown in FIG. 12, the STA 420 may include an element for cancelling SI to perform full-duplex communication.

Also, the above-described full-duplex communication method may be implemented using a program (or application) including an executable algorithm that may be executed by a computer. The full-duplex communication method may be embedded into an AP and an STA.

The program may be stored and provided in a non-transitory computer readable medium. The non-transitory computer readable medium refers not to a medium that temporarily stores data such as a register, a cache, and a memory but to a medium that semi-permanently stores data and that is readable by a device. Specifically, the above-described various applications or programs may be provided while being stored in a non-transitory computer readable medium such as a compact disc (CD), a digital versatile disc (DVD), a hard disk, a Blu-ray disc, a Universal Serial Bus (USB), a memory card, a read-only memory (ROM), etc.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A full-duplex communication method in a high efficiency wireless local area network (WLAN), the full-duplex communication method being performed by an access point (AP) in a WLAN network, the method comprising:
   transmitting a reference frame to at least one station (STA);
   receiving an uplink frame from the at least one STA in a time period determined on a basis of the transmitted reference frame; and
   transmitting a downlink frame to the at least one STA in a specific time duration of the time period,
   wherein the uplink frame and the downlink frame aligned at frame boundaries in the time period are transmitted simultaneously through a same channel,
   wherein a legacy part of the downlink frame is a null field in which no signal is transmitted or another signal type is transmitted, and
   wherein a non-legacy part of the downlink frame and a non-legacy part of the uplink frame are aligned in a specific time duration of the time period.

2. The full-duplex communication method of claim 1, wherein the AP transmits the downlink frame to a solicited STA which transmits the uplink frame.

3. The full-duplex communication method of claim 1, wherein the AP transmits the downlink frame to an unsolicited STA.

4. The full-duplex communication method of claim 1, wherein the reference frame includes a triggered response scheduling (TRS) control field.

5. The full-duplex communication method of claim 1, wherein the uplink frame is a High-Efficiency Trigger-Based (HE TB) PPDU.

6. The full-duplex communication method of claim 1,
   wherein the legacy part of the uplink frame includes a pre-HE modulated field of the uplink frame and the non-legacy part of the uplink frame includes an HE modulated field of the uplink frame,
   wherein the non-legacy part of the downlink frame includes an HE modulated field of the downlink frame, and
   wherein the specific time duration is included in a time period in which the HE modulated field of the uplink frame is received and the HE modulated field of the downlink frame is transmitted.

7. The full-duplex communication method of claim 1, wherein the specific time duration is a period after a training sequence for the uplink frame is processed in the AP.

8. The full-duplex communication method of claim 1, wherein the downlink frame and the uplink frame are transmitted in different resource units (RUs) respectively.

9. The full-duplex communication method of claim 1, wherein the downlink frame and the uplink frame are transmitted in a common resource unit (RU).

10. A full-duplex communication method in a high efficiency wireless local area network (WLAN), the full-duplex communication method being performed by a specific station (STA) in a WLAN network, the method comprising:
    receiving a reference frame from an access point (AP);
    transmitting an uplink frame to the AP in a time period determined on a basis of the reference frame; and
    receiving a downlink frame from the AP in a specific time duration of the time period determined by the reference frame,
    wherein the reference frame is transmitted to a plurality of STAs including the specific STA,
    wherein the time period is a period in which at least one of the plurality of STAs is solicited to transmit an uplink frame to the AP,
    wherein the uplink frame and the downlink frame aligned at frame boundaries in the time period are transmitted simultaneously through a same channel,
    wherein a legacy part of the downlink frame is a null field in which, and
    wherein a non-legacy part of the downlink frame and a non-legacy part of the uplink frame are aligned in a specific time duration of the time period.

11. The full-duplex communication method of claim 10, wherein the uplink frame is a High-Efficiency Trigger-Based (HE TB) PPDU.

12. The full-duplex communication method of claim 10,
    wherein the legacy part of the uplink frame includes a pre-HE modulated field of the uplink frame and the non-legacy part of the uplink frame includes an HE modulated field of the uplink frame, wherein the non-legacy part of the downlink frame includes an HE modulated field of the downlink frame, and wherein the specific time duration is included in a time period in which the HE modulated field of the downlink frame is received and the HE modulated field of the uplink frame is transmitted.

13. The full-duplex communication method of claim 10, wherein the downlink frame and the uplink frame are transmitted in different resource units (RUs) respectively.

14. The full-duplex communication method of claim 10, wherein the downlink frame and the uplink frame are transmitted in a common resource unit (RU).

15. A station apparatus for performing full-duplex communication in a high efficiency wireless local area network (WLAN), the station apparatus comprising:

a communication device configured to receive a reference frame from an access point (AP) in a WLAN, transmit an uplink frame to the AP in a time period, and receive a downlink frame from the AP in a specific time duration of the time period; and a processor configured to determine the time period or the specific time duration based on the reference frame and process the downlink frame transmitted in the specific time duration, wherein the reference frame is transmitted to a plurality of stations including the station apparatus, wherein the time period is a period in which at least one of the plurality of stations transmits an uplink frame to the AP, wherein the uplink frame and the downlink frame aligned at frame boundaries in the time period are transmitted simultaneously through a same channel, wherein a legacy part of the downlink frame is a null field in which no signal is transmitted or another signal type is transmitted, and wherein a non-legacy part of the downlink frame and a non-legacy part of the uplink frame are aligned in a specific time duration of the time period.

16. The station apparatus of claim 15, wherein the communication device transmits a High-Efficiency Trigger-Based (HE TB) PPDU to the AP as the uplink frame.

17. The station apparatus of claim 15, wherein the legacy part of the uplink frame includes a pre-HE modulated field of the uplink frame and the non-legacy part of the uplink frame includes an HE modulated field of the uplink frame, wherein the non-legacy part of the downlink frame includes an HE modulated field of the downlink frame, and wherein the specific time duration is included in a time period in which the HE modulated field of the downlink frame is received and the HE modulated field of the uplink frame is transmitted.

18. The station apparatus of claim 15, wherein the downlink frame and the uplink frame are transmitted in individual resource units (RUs) respectively.

19. The station apparatus of claim 15, wherein the downlink frame and the uplink frame are transmitted in a common resource unit (RU).

* * * * *